United States Patent [19]

Christy

[11] Patent Number: 4,869,432
[45] Date of Patent: Sep. 26, 1989

[54] ELASTOMERIC FLOW CONTROL PIN FOR IRRIGATION SYSTEMS

[76] Inventor: Mark H. Christy, 1501 E. Ocean Blvd., Balboa, Calif. 92661

[21] Appl. No.: 198,336

[22] Filed: May 25, 1988

Related U.S. Application Data

[63] Continuation-in-part of Ser. No. 128,880, Dec. 4, 1987, Pat. No. 4,846,406.

[51] Int. Cl.$^4$ .............................................. B05B 15/00
[52] U.S. Cl. ........................................ 239/542; 138/45
[58] Field of Search ........... 239/542, 547, 570, 533.13; 138/44, 45, 46

[56] References Cited

U.S. PATENT DOCUMENTS

| | | | |
|---|---|---|---|
| 2,515,073 | 7/1950 | Binnall et al. | 138/45 |
| 2,632,476 | 3/1953 | Miller | 138/45 |
| 4,095,745 | 6/1978 | Christy et al. | 239/542 |
| 4,113,180 | 9/1978 | Christy | 239/542 |
| 4,313,471 | 2/1982 | Lissau | 138/45 |

*Primary Examiner*—Andres Kashnikow
*Assistant Examiner*—Kevin P. Weldon
*Attorney, Agent, or Firm*—Phillips, Moore, Lempio & Finley

[57] ABSTRACT

A pressure modulated flow control valve, particularly adaptd for water irrigation applications, comprises an unitary elastomeric pin defining at least one flow passage therethrough and a flexible diaphragm overlying the flow passage, adjacent to an inlet to the valve. In operation, the diaphragm is exposed to water pressure prevalent at the inlet to the valve to flex into and vary the size of the passage to control and modulate the flow rate therethrough. In the preferred embodiment of this invention, the diaphragm will function to maintain a micro flow rate through the passage "near constant", e.g., selected from within the approximate overall maximum range of from 2.0 gph to 60.0 gph. The pin in interchangeable in a housing of the control valve to effect the desired near constant flow rate and is particularly adapted for use in pressure modulated drip-irrigation systems wherein water is communicated through the valve to a water distributing device, such as a sprayer or drip-type emitter.

30 Claims, 4 Drawing Sheets

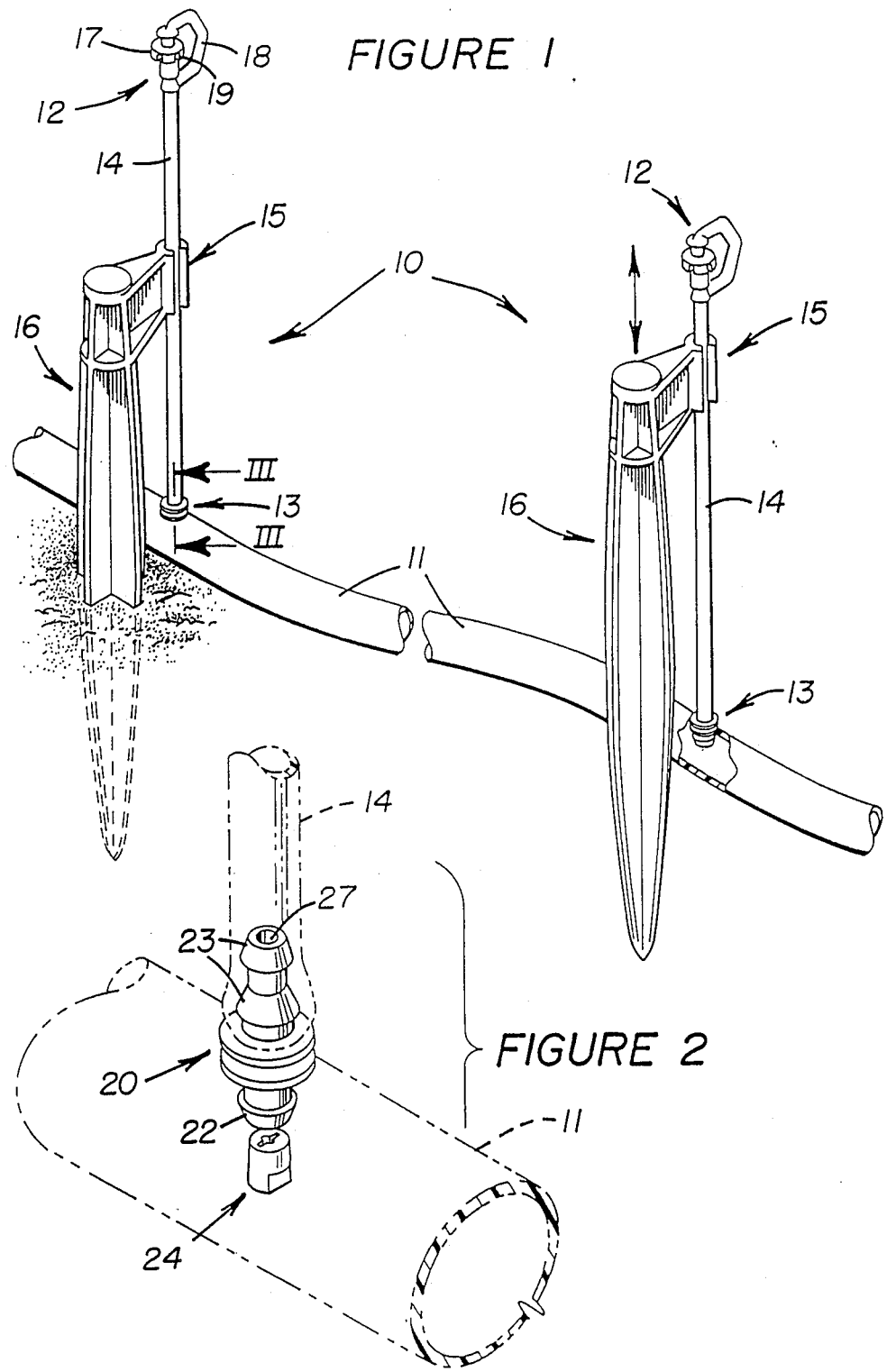

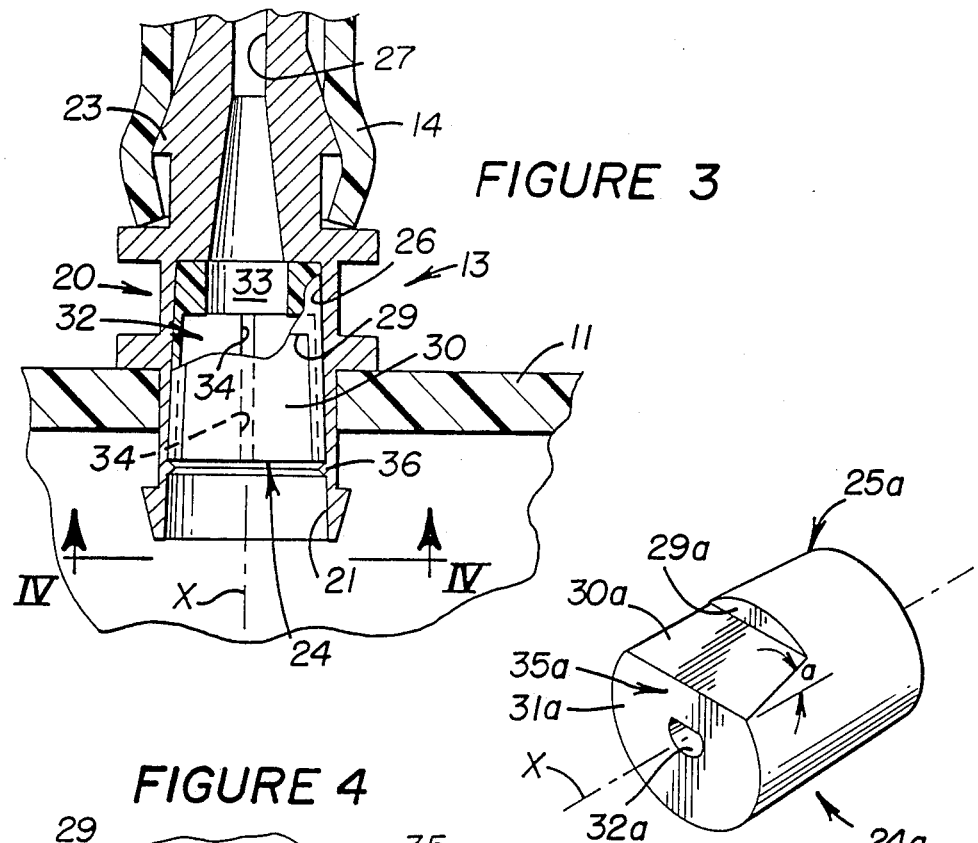
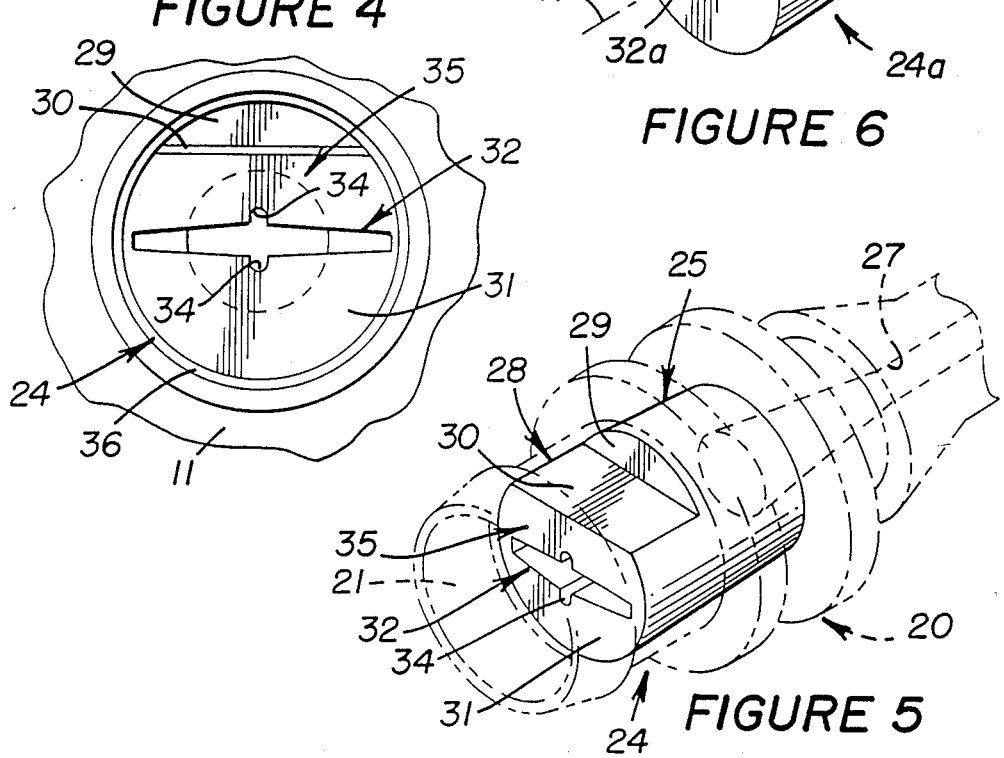

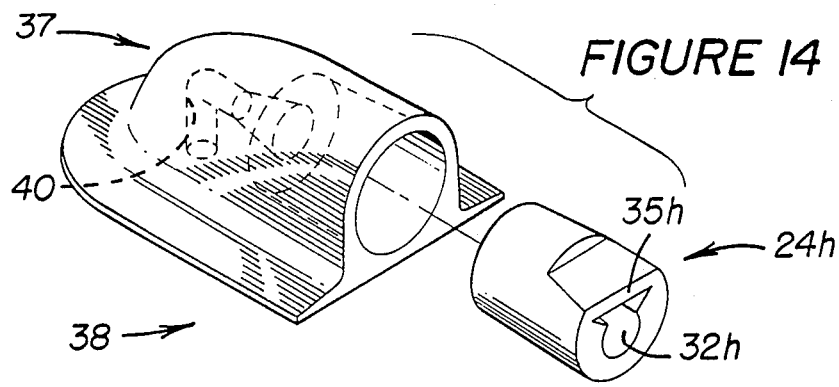
FIGURE 14
FIGURE 13
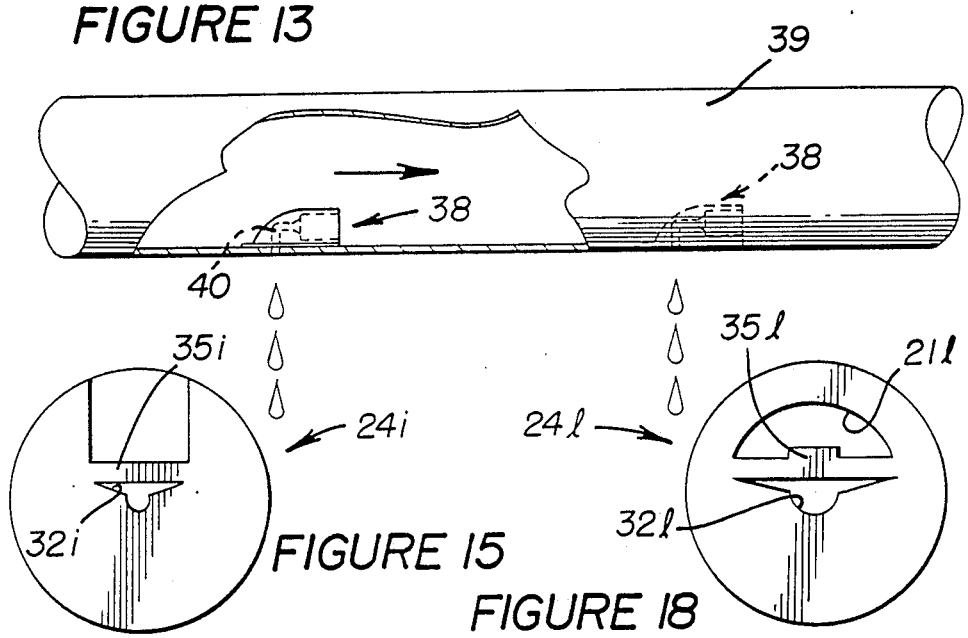
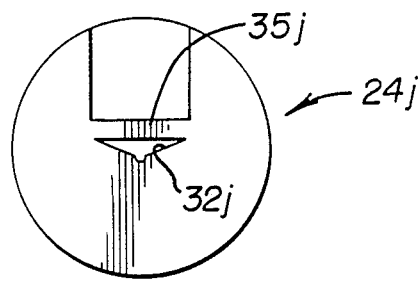
FIGURE 16
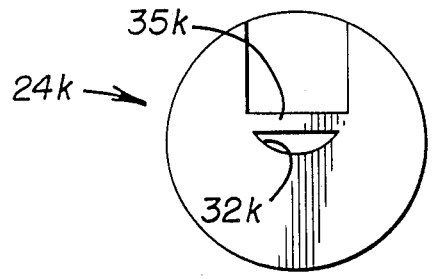
FIGURE 17

ELASTOMERIC FLOW CONTROL PIN FOR IRRIGATION SYSTEMS

CROSS-REFERENCE TO RELATED APPLICATION

This application is a continuation-in-part of U.S. patent application Ser. No. 128,880, filed on Dec. 4, 1987 for "Micro Flow Control Valve For Irrigation Systems And Method" now U.S. Pat. No. 4,846,406.

TECHNICAL FIELD

This invention relates to a pressure modulated flow control valve and, more particularly, to a flow control valve having an interchangeable pin for selectively controlling the flow rate therethrough for irrigation purposes.

BACKGROUND OF THE INVENTION

The popularity of "micro" flow irrigation systems (e.g., rated from 2.0 gph to 60.0 gph) for garden and related agricultural uses, has dictated the need for pressure modulating flow control valves that will communicate a near constant flow rate to a water distributing device, such as a sprayer or drip-type emitter. Systems of this type include a main water line composed of a plastic tube and a series of spaced smaller plastic tubes or branch lines interconnected between the main water line and each water distributing device. In addition to the problem of not providing a substantially constant flow rate of water to the distributing device, many conventional systems are prone to clogging.

Various pressure-compensating flow control valves have been proposed for solving the above, briefly described problems in the field of irrigation, such as for drip or trickle irrigation systems. For example applicant's U.S. Pat. No. Re 29,022 discloses various embodiments of a self-flushing and pressure-compensating irrigation valve that will function to maintain a predetermined near constant flow rate of water at the outlet thereof in response to fluctuations of main line water pressure. Although valves of this type work quite well for many irrigation applications, there is a need for providing a less complex valve that can be manufactured economically and installed or replaced more expeditiously.

Further, pressure modulating valves of the latter type are oftentimes designed to have flexible lips, composed of a highly flexible elastomeric material, that are entirely surrounded by water at the inlet to the valve. Flexing and deformation of the lips during operation render it difficult, at times, to closely calibrate the desired near constant flow rate of the valve. Applicant's above-referenced U.S. patent application Ser. No. 128,880 provides an improvement over conventional pressure modulating flow control valves in that it comprises a flexible elastomeric tube that is stretched over the end of a slotted metal pin. Pressure fluctuations at the inlet to the valve will function to flex a diaphragm portion of the tube within the channel to vary the effective size of the channel and to provide the desired near-constant flow rate.

Although the latter multi-piece flow control valve functions quite well for many applications, it exhibits complexities in design and is relatively expensive to manufacture and install. In addition, the elastomeric tube may tend to become dislodged from the pin, particularly when the pin is subjected to a negative pressure occasioned by draining of the main water line.

SUMMARY OF THE INVENTION

An object of this invention is to provide an improved pressure modulated flow control valve that is economical to manufacture, exhibits a high degree of structural integrity and is highly efficient in operation.

The flow control valve of this invention is particularly adapted for use in irrigation systems wherein it is desirable to provide a near constant micro flow rate of water, e.g., within the approximate overall maximum range of from 2.0 gph to 60.0 gph. In pressure modulated systems of this type, water is communicated to a water distributing device, such as a mini sprayer or drip-type emitter. The flow control valve will find other applications in pressure modulated fluid control systems, well-known to those skilled in the arts relating hereto.

In its broadest aspects, the flow control valve comprises an unitary elastomeric pin defining at least one flow passage therethrough and flexible diaphragm means overlying the flow passage and adapted to be subjected to fluctuating fluid pressures at an inlet to the valve. The diaphragm means will flex into and vary the size of the flow passage to maintain the flow rate of the fluid at a predetermined near constant flow rate in response to a pressure differential produced between the flow passage and externally on the diaphragm means.

In the preferred embodiment of this invention, the pin is snugly mounted within a housing with a peripheral portion of the body element being relieved to permit the diaphragm means to flex freely in the housing or a "blind" sub-chamber is defined in the pin to overly the diaphragm means and to receive the fluctuating fluid pressure directly.

In another aspect of this invention, the flow control valve is connected within an irrigation system for communicating a near constant micro flow rate of water to a water distributing device, such as a minisprayer or drip-type emitter.

BRIEF DESCRIPTION OF THE DRAWINGS

Other objects and advantages of this invention will become apparent from the following description and accompanying drawings wherein:

FIG. 1 illustrates an irrigation system, including a flow control valve embodiment of this invention adapted to communicate water to a water distributing device at a near constant flow rate;

FIG. 2 is an exploded isometric view of the control valve, prior to the assembly of component parts thereof;

FIG. 3 is a longitudinal sectional view of the control valve, generally taken in the direction of arrows III—III in FIG. 1;

FIG. 4 is an end elevational view of the control valve, taken in the direction of IV—IV in FIG. 3;

FIG. 5 is an isometric view of a pin employed in the control valve;

FIG. 6 is an isometric view of a modified pin;

FIG. 13 is a side elevational view, partially illustrating a plastic drip irrigation tube having a pair of flow control valves or emitters of this invention mounted therein;

FIG. 14 is an exploded isometric view of one of the control valves of FIG. 13, showing its pin removed from a housing thereof; and FIGS. 15–18 are end elevational views, similar to FIG. 4, illustrating further modifications of the pin only.

DESCRIPTION OF THE PREFERRED EMBODIMENTS GENERAL DESCRIPTION

Figure 7:
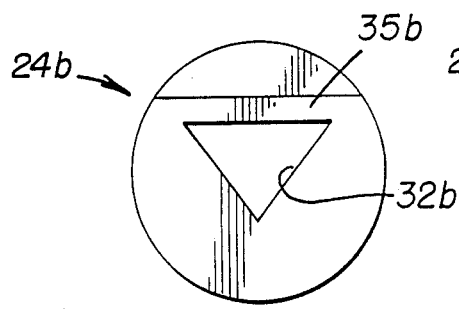
FIGS. 7–12 are end elevational views, similar to FIG. 4, illustrating further modifications of the pin only.

FIG. 1 partially illustrates an integrated irrigation system 10 comprising a main water line or tube 11 for supplying water at a variable pressure level, within the approximate range of from 10 psi to 60 psi, to a plurality of water distributing devices, shown in the form of mini sprayers 12. In certain irrigation systems, the water is admixed with sulfuric acid, chlorine, fertilizers or the like in a conventional manner. A pressure modulated flow control valve 13, embodying this invention, is interconnected between the main water line and a respective branch line or tube 14 having sprayer 12 suitably connected to an upper end thereof. The tube is adjustably mounted in semi-tight, slip-fit relationship within a bracket 15, extending transversely from an upper end of a support stake 16, whereby the sprayer can be adjusted vertically relative to the stake and ground level.

As described more fully hereinafter, water communicated to sprayer 12 from control valve 13 is maintained at a predetermined near constant flow rate, preferably selected from within the approximate overall maximum range of from 2.0 gph to 60.0 gph and more commonly from within the range of from 2.0 gph to 30.0 gph. This near constant micro flow rate will be maintained despite fluctuations in water pressure communicated to an inlet of the control valve from main water line 11, i.e., pressure modulation. In other applications of this invention of the type referred herein, such range could be expanded to 0.25 gph to 240 gph. As further described hereinafter, the control valve is self-purging to prevent foreign particle build-up therein which might affect its operation.

The conventional type of mini sprayer illustrated comprises an annular head 17 rotatably mounted within a C-shaped support arm 18 with the head having at least one pair of diametrically opposed and vertically disposed slots 19 defined externally thereon. The slots are inclined slightly relative to the longitudinal axis of head 17 whereby pressurized water emitted from the outlet end of the tube will impinge within the slots and rotate the head to distribute the water in a spray-like fashion.

It should be understood that other types of water distributing devices can be used with the pressure modulated flow control valve of this invention. For example, and briefly referring to FIGS. 13 and 14, the flow control valve is adapted for use with drippers or emitters, either connected directly to a branch tube of an irrigation system or mounted within a larger water line thereof, such as shown in these figures. Further, the flow control valve is adapted for use in other fluid circuits for closely controlling outlet flow in a pressure modulated manner (e.g., vacuum breakers, air relief valves, water purification systems, etc.), as will be appreciated by those skilled in the arts relating hereto.

DETAILED DESCRIPTION

Referring to FIGS. 2–5, flow control valve 13 comprises a tubular housing 20 defining a water receiving cylindrical chamber 21 at the inlet to the valve. The chamber is adapted to receive water or other hydraulic fluid from main water line 11 at a fluctuating working pressure level, normally within the approximate range of from 10 psi to 60 psi for most irrigation applications for which this invention is particularly adapted. One or more annular barbs 22 are formed externally at the inlet end of the housing for the purpose of piercing main water line 11 in a conventional manner to anchor and seal housing 20 of the control valve thereat. Similar barbs 23 are formed at the outlet end of the housing for attaching and sealing the inlet end of tube 14 thereat in a conventional manner.

Flow control valve 13 further comprises a body element, shown in the form of a generally cylindrical and unitary elastomeric pin 24. The pin has a near cylindrical first body portion 25 adapted to be slip-fit and snugly held within a bore 26 of housing 20 which defines inlet chamber 21 at the inlet end of the housing and valve. As shown in FIGS. 3 and 5, the outer walls of the pin and the mating inner walls of bore 26 are preferably each frusto-conically shaped (converging towards tube 14) to aid in sealing and to facilitate correct insertion of the pin in the bore. The bore communicates with a cylindrical passage 27, formed through the housing to communicate with tube 14 and which is disposed on a longitudinal axis X of the housing and integrated control valve (FIG. 3).

Pin 24 (as well as the other pin embodiments hereinafter described) is entirely composed of an elastomeric material exhibiting sufficient flexibility and related characteristics (e.g., durometer hardness in the approximate range of from 30 to 60) to provide the functional desiderata herein described. For example, the pin may be composed of a non-degradable natural rubber, synthetic rubber, silicone rubber or the like. Housing 20 is preferably composed of a standard semi-rigid plastic material, such as polyethylene or polypropylene.

The pin further comprises a partially near cylindrical second body portion 28 extending from body portion 25 at a radial shoulder 29, intermediate opposite ends of the pin. The shoulder extends radially inwardly towards longitudinal axis X of the pin and intersects a flat working surface 30, defined on body portion 28 of the pin. Surface 30 further intersects the upper edge of a frontal sidewall 31 of the pin and defines a chord of a circle, subscribing the outer diameter of the pin, when the pin is viewed in cross-section (FIG. 4). In the embodiment illustrated, the arc subscribing the partial circle approximates 250°. It should be understood that surface 30 could be convex, concave or assume other shapes when viewed in cross-section and/or side elevation.

A flow passage 32 is defined axially through the pin to communicate with a cylindrical outlet chamber 33, communicating with passage 27 of housing 20. When passage 32 is viewed in cross-section, as typified by FIG. 4, it extends substantially fully across the width and diameter of the pin. The passage comprises a pair of diametrically opposed and arcuately shaped secondary passages 34 defined intermediate the ends thereof. The unitary elastomeric pin thus defines a flexible diaphragm 35 overlying flow passage 32, adjacent to the inlet of the valve, that is exposed to fluctuating water pressure prevalent in inlet chamber 21.

The substantial body of elastomer engaging the inner wall of housing 20 and underlying diaphragm 35 will provide a firm and solid "backup" for the diaphragm. Thus, water pressure prevalent in chamber 21 (or subchamber 211 in FIG. 18) will only act against the exposed upper and inner surfaces of the diaphragm for pressure modulation purposes. This feature is common to all pin embodiments disclosed herein.

A radial flange 36 is integrally formed internally on housing 20 to extend radially inwardly adjacent to frontal side 31 of pin 24. When the elastomeric pin is installed in the housing, it will exhibit sufficient flexibility and related physical characteristics (e.g., durometer hardness) to be snapped into place behind the flange. The flange will prevent the pin from becoming dislodged from the housing, particularly when a partial negative vacuum is drawn in main water line 11, such as when the line is drained.

In operation, the diaphragm will flex into and cooperate with the flow passage to vary the cross-sectional size of the passage in response to pressure fluctuations in chamber 21. Such flexing will maintain the flow rate of water at the outlet of the valve at a predetermined near constant flow rate, preferably selected from within the approximate overall maximum range of from 2.0 gph to 60.0 gph for irrigation applications, despite fluctuation in water pressure in chamber 21. Otherwise stated, flexing of the diaphragm is responsive to the differential in water pressure produced between inlet chamber 21 and flow passage 32.

Initial communication of water from the main water line to the inlet chamber will permit unrestricted flow through fully opened passage 32 to automatically purge the system and valve of mineral particles and other contaminants that could adversely affect the valve's operation, i.e., the valve is self-purging and self-cleaning. Subsequent increases in water pressure in the inlet chamber will function to at least substantially close the passage, on either side of secondary passages 34. Thereafter, water flow will proceed through these substantially smaller second passages with the relative opening and closing of the full passage being directly responsive to the pressure differential existing between the passage and inlet chamber.

Flow control valve 13, is particularly adapted for relatively low flow rate applications in the range of from 2.0 gph to 20.0 gph, for example. In the embodiment illustrated in FIGS. 1–5, which was tested experimentally, pin 24 was dimensioned (in inches) as follows and when viewed in cross-section: outside diameter 0.150; largest (center) radial depth of shoulder 29: 0.030; transverse chordal length of surface 30: 0.120; transverse width of passage 32: 0.130; radial depth of the passage at its ends and center: 0.010 and 0.030, respectively; diameter of each secondary passage 34: 0.010; and radial thickness of diaphragm 35, between surface 30 and passage 32: 0.040 at its lateral ends and 0.030 at its center. When viewed in side elevation, the length of the pin was 0.200 in. and the length of working surface 30 of the diaphragm was 0.125 in.

It should be noted in FIG. 4 that opposed surfaces defining each outer end of passage 32, extending radially outwardly from secondary passages 34, preferably converge towards each other. Thus, diaphragm 35 is progressively thinner towards its center. This construction of the diaphragm aids in closely controlling the opening and closing of the passage during operation.

As suggested above, flow control valve 13 is particularly adapted for use in relatively "low" micro flow rate irrigation applications (e.g., 2.0 to 20.0 gph). The majority of flow control valve embodiments described herein find application as micro flow control valves, used in various irrigation systems of the type described above.

The term "micro flow rate" as used herein means a flow rate of water or other fluid selected from within the approximate overall maximum range of from 2.0 gph to 60.0 gph, and more commonly from within the range of from 2.0 gph to 20.0 gph. The further term "near constant micro flow rate" means a preselected flow rate for a particular flow control valve that will be closely approximated when the control valve is placed in operation.

FIG. 6 illustrates a modified pin 24a which is adapted for use in relatively "high" micro flow rate irrigation applications wherein the micro flow rate exceeds approximately 20 gph. Identical numerals depict corresponding constructions. Pin 24a is adapted to be substituted in lieu of pin 24 whereby the basic irrigation system can remain intact with only the pin replaced to select a different near constant micro flow rate.

In particular, pin 24a is also adapted to be slip-fit into bore 26 of housing 20 (FIG. 3). If so desired, an inlet end of passage 27 can be flared to define a frusto-conically shaped portion diverging towards pin 24a and/or pin 24 (FIG. 3). A radial shoulder 29a is formed on the pin, intermediate the opposite ends thereof.

An exposed surface 30a is formed on the pin to intersect between the radially inner end of shoulder 29a and the upper edge of a frontal side 31a of the pin. Surface 30a is preferably tapered downwardly and converges towards the frontal side of the pin to define an acute "a" angle relative to longitudinal axis X of the pin, preferably selected from the approximate range of from 2° to 15°. If so desired, corresponding surface 30 of pin 24 (and corresponding surfaces of other pin embodiments described herein) could be formed with a similar taper.

A flow passage 32a is defined axially through pin 24a and, when viewed in cross-section, defines an arcuate wall intersected by a flat wall, defining a chord intersecting the arc defining the arcuate wall. The frontal edge of surface 30a also forms a chord of a circle defining the cross-section of the pin and is disposed in parallel relationship relative to the flat wall partially defining passage 32a. The semi-arcuate cross-sectional configuration of passage 32a is constant throughout the axial length of the pin.

Flexible diaphragm 35a overlies flow passage 32a and is adapted to be exposed to fluctuating water pressures prevalent in inlet chamber 21 (FIG. 3) in the same manner as described above in respect to diaphragm 35 of pin 24. In particular, diaphragm 35a will flex into and vary the size of flow passage 32a to maintain the water at a predetermined near constant flow rate. The tapering of upper wall 30a of the pin in the manner described above, provides that the inlet end of the diaphragm will flex more readily than portions of the diaphragm downstream therefrom.

FIGS. 7–12 are elevational views similar to FIG. 4, illustrating modified pins 24b–24g only. Identical numerals depict corresponding constructions with remaining portions of the pins being substantially identical to corresponding portions of pin 24 or 24a. It should be further understood that each of the flow passages described extends longitudinally completely through each pin and the pin is adapted to be mounted in housing 20 in the same manner as described above in respect to pin 24 (FIG. 3).

Figure 8:
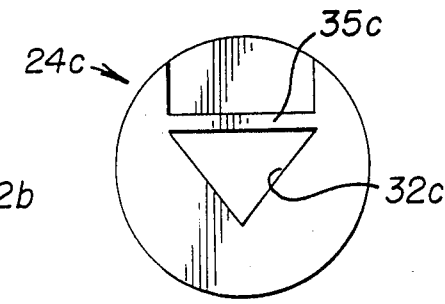
Figure 9:
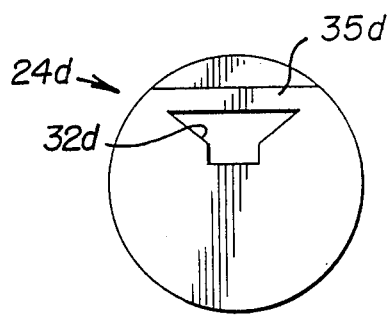

In FIG. 7, passage 32b of pin 24b is triangular with its base paralleling diaphragm 35b. Pin 24c of FIG. 8 is similar, except that diaphragm 35c is thinner and is recessed within the body of the pin. In FIG. 9, passage 32d has a "square" configuration at its apex.

Figure 10:
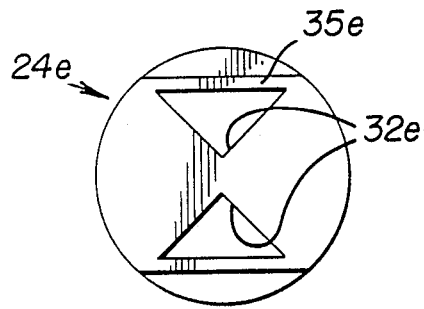
Figure 11:
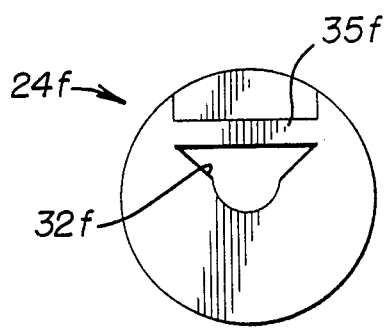
Figure 12:
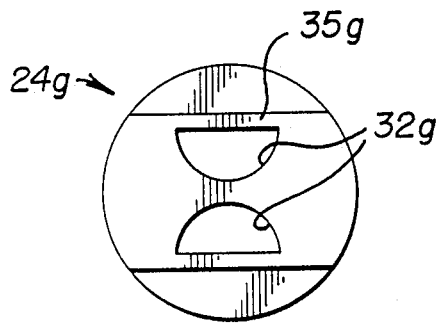

In FIG. 10, pin 24e includes a pair of triangular flow passages 32e, diametrically opposed relative to each other, and a diaphragm 35e overlying each passage. Pin 24f of FIG. 11 is similar to pin 24c of FIG. 8, but passage 32f has an arcuate configuration at its apex. FIG. 12 is similar to FIG. 10, but pin 13g has a pair of diametrically opposed and semi-circular passages 32g.

FIGS. 13 and 14 illustrate another pin embodiment 24h that is adapted to be inserted into a housing 37 to provide an emitter or control valve 38, adapted for drip irrigation purposes. In particular, the housings of a plurality of the emitters can be suitably bonded or otherwise secured internally within a plastic tube or pipe 39. The emitters will function to emit water from tube 39 at a controlled drip rate, at spaced locations at ground level.

Pin 24h has a flow passage 32h formed entirely therethrough that communicates with an outlet passage 40, formed through housing 37 of each emitter. A flexible diaphragm 35h that will function to pressure modulate the water in the manner described above. Housing 37 is configured internally, similar to housing 20 (FIG. 3), to snugly retain pin 24h therein.

FIGS. 15–18 are elevational views similar to FIG. 4, illustrating additional modified pins 24i–24l only. Again, identical numerals depict corresponding constructions with remaining portions of the pins being substantially identical to corresponding portions of the above-described pins. It should be understood that each of the flow passages described extends longitudinally completely through each pin and the pin is adapted to be mounted in housing 20 in the same manner as described above in respect to pin 24 (FIG. 3).

In FIG. 18, a sub-chamber 21l is defined entirely within pin 24l and overlies diaphragm 35l to flex into and vary the size of flow passage 32l in the manner described above. The illustrated proximal, inlet end of the sub-chamber communicates directly with chamber 21 with the opposite and closed distal end terminating within the pin, approximately at the distal end of the diaphragm. In contrast to the afore-described pin embodiments wherein the equivalent sub-chamber is exposed to an inner wall of housing 20 (e.g., FIG. 4), sub-chamber 21l defines and is separated from the housing (when inserted therein) by a radial wall thickness of the pin. In one embodiment, the pin has a length of 0.250 in and sub-chamber 21l extends into the pin to an axial depth of 0.125 in.

I claim:

1. In an irrigation system comprising a pressure-modulated flow control valve means for maintaining a predetermined near constant flow rate of water from an outlet thereof despite fluctuations in water pressure communicated to an inlet to said valve means, said valve means comprising a housing having a solid inner wall defining a water-receiving chamber at the inlet to said valve means adapted to receive water therein at a working pressure level within the approximate range of from 10 psi to 60 psi, and an unitary pin having a longitudinal axis and disposed in said chamber, said pin being entirely composed of an elastomeric material and having a solid body portion defining substantial outer surface portions engaging the inner wall of said housing, said pin comprising, at least one flow passage defined through the solid body portion of said pin for communicating said inlet with said outlet, a sub-chamber at least in part defined by said pin and communicating with said chamber, and flexible diaphragm means, defining a working surface thereon spaced inwardly from the inner wall of said housing and extending transversely of said axis, overlying said flow passage and separating said sub-chamber from said flow passage adjacent to the inlet to said valve means and having only its working surface solely exposed to water pressure prevalent in said sub-chamber for flexing into and varying the size of said flow passage, against a firm and solid backup provided by engagement of the substantial outer surface portions of said body portion with the inner wall of said housing, to maintain the flow rate of water at the outlet of said valve means at said predetermined near constant flow rate in response to a differential in water pressure produced between said sub-chamber and said flow passage.

2. The irrigation system of claim 1 wherein said pin comprises a first body portion snugly slip-fit within a bore defined by the inner wall of said housing and a second body portion having said diaphragm means formed thereon.

3. The irrigation system of claim 2 wherein a shoulder is formed between said first and second body portions, intermediate opposite ends of said pin, to extend inwardly towards the axis of said pin to intersect and define a downstream end of said sub-chamber and further define a downstream edge of said working surface on said diaphragm means solely exposed to water pressure prevalent in said sub-chamber.

4. The irrigation system of claim 3 wherein said working surface further intersects an edge on frontal side of the second body portion of said pin.

5. The irrigation system of claim 4 wherein said working surface is flat.

6. The irrigation system of claim 4 wherein said pin is entirely generally cylindrical and said edge defines a chord of a circle, subscribing a circumference of a circle.

7. The irrigation system of claim 4 wherein the working surface of said diaphragm is recessed within the second body portion of said pin and the remainder of said second body portion is solid.

8. The irrigation system of claim 4 wherein said working surface tapers downwardly towards the frontal side of said pin and converges relative to said axis to define an acute angle therebetween.

9. The irrigation system of claim 8 wherein said angle is selected from the approximate range of from 2° to 15°.

10. The irrigation system of claim 1 or 4 wherein a pair of diametrically opposed, continuously isolated and separate flow passages are defined through said pin and a said diaphragm means overlies each of said passages.

11. The irrigation system of claim 1 wherein said flow passage extends substantially fully across the width of said pin.

12. The irrigation system of claim 11 wherein said flow passage comprises a pair of diametrically opposed second passage means defined between the ends thereof for remaining open when the remainder of said flow passage closes.

13. The irrigation system of claim 1 wherein said flow passage is defined by an arcuate wall intersected by a flat wall, defining a chord intersecting an arc defining said arcuate wall, when said flow passage is viewed in cross-section.

14. The irrigation system of claim 1 wherein said flow passage is at least generally triangular, when viewed in cross-section.

15. The irrigation system of claim 1 wherein said sub-chamber is defined entirely and terminates within said pin and is disposed in overlying relationship relative to said diaphragm means to further define a wall thickness of said pin between said housing and said sub-chamber, said sub-chamber communicating directly with said chamber.

16. The irrigation system of claim 1 further comprising means for locking said pin in position within said housing.

17. The irrigation system of claim 1 further comprising a water distributing means connected to the outlet of said valve means for receiving water therefrom at said ear constant flow rate.

18. The irrigation system of claim 17 wherein said water distributing means is a sprayer.

19. The irrigation system of claim 17 wherein said water distributing means is a drip-type emitter.

20. A pressure modulated flow control valve means for maintaining a predetermined near constant flow rate of fluid from an outlet thereof despite fluctuations in fluid pressure communicated to an inlet thereof, said valve means comprising, a unitary elastomeric pin disposed on a longitudinal axis and having a solid body portion defining at least one flow passage therethrough, said pin defining substantial outer surface portions sized to engage an inner wall of a housing of said control valve, a sub-chamber at least in part defined by said pin and communicating with said inlet, and flexible diaphragm means formed integrally with said pin to separate said sub-chamber from said passage and overlying said flow passage for being subjected to said fluctuations in fluid pressure and flexing into and varying the size of said flow passage, against a firm and solid backup provided by substantial outer surface portions of said pin when said portions engage the inner wall of said housing, to maintain the flow rate of fluid at the outlet of said valve means at said predetermined near constant flow rate in response to a differential in fluid pressure produced between said flow passage and externally on said diaphragm means, said flexible diaphragm means defining an outer working surface thereon extending transversely of said axis.

21. The valve means of claim 20 wherein said pin comprises a first body portion adapted to be slip-fit within a bore defined in said housing and a second body portion having said diaphragm means formed thereon and wherein a shoulder is formed between said first and second body portions, intermediate opposite ends of said pin, to extend inwardly towards the axis of said pin to intersect and define a downstream end of said sub-chamber and a downstream edge of said working surface on said diaphragm means adapted to be solely exposed to said fluid pressure in said sub-chamber.

22. The valve means of claim 21 wherein said working surface is flat and further intersects an edge on a frontal side of the second body portion of said pin.

23. The valve means of claim 20 wherein said pin is entirely generally cylindrical and said edge defines a chord of a circle.

24. The valve means of claim 21 wherein the working surface of said diaphragm means is recessed within the second body portion of said pin and the remainder of said second body portion is solid.

25. The valve means of claim 22 wherein said working surface tapers downwardly towards the frontal side of said pin and converges relative to said axis to define an acute angle therebetween.

26. The valve means of claim 20 wherein a pair of diametrically opposed, continuously isolated and separate flow passages are defined through said pin and said diaphragm means overlies each of said passages.

27. The valve means of claim 20 wherein said flow passage extends substantially fully across the width of said pin and comprises a pair of diametrically opposed second passage means defined between the ends thereof for remaining open when the remainder of said flow passage closes.

28. The valve mean of claim 20 wherein said flow passage is defined by an arcuate wall intersected by a flat wall, defining a chord intersecting an arc defining said arcuate wall, when said flow passage is viewed in cross-section.

29. The valve means of claim 20 wherein said flow passage is at least generally triangular when viewed in cross-section.

30. The valve means of claim 20 wherein said sub-chamber is defined entirely and terminates within said pin and is disposed in overlying relationship relative to said diaphragm means to further define a wall thickness of said pin radially outwardly from said sub-chamber, said sub-chamber exposed exteriorly of said pin to receive said fluid pressure therein.

* * * * *